United States Patent [19]

Eisenhardt et al.

[11] 4,027,733
[45] June 7, 1977

[54] WEED PULLING MACHINE

[76] Inventors: Fred W. Eisenhardt, 610 University Drive N., Fargo, N. Dak. 58102; Wayne S. Tonsfeldt, Sabin, Minn. 56580

[22] Filed: Aug. 28, 1975

[21] Appl. No.: 608,681

[52] U.S. Cl. .................................. 171/58; 56/51
[51] Int. Cl.² .............. A01D 25/04; A01D 49/00
[58] Field of Search ................. 171/50–61; 56/14.3, 51

[56] References Cited

UNITED STATES PATENTS

| | | | |
|---|---|---|---|
| 2,660,013 | 11/1953 | Priestley | 171/58 |
| 3,017,732 | 1/1962 | Keyes | 56/11.9 |
| 3,437,152 | 4/1969 | Barrentine | 171/58 |
| 3,716,974 | 2/1973 | Wehde | 56/14.3 |
| 3,769,782 | 11/1973 | Cler | 171/58 X |

*Primary Examiner*—Russell R. Kinsey
*Attorney, Agent, or Firm*—Burd, Braddock & Bartz

[57] ABSTRACT

A machine for pulling weeds from rows having crops, as sugar beets. The machine has a transverse tool bar carrying a hitch. The hitch connects the tool bar to a tractor. A plurality of weed-pulling units are mounted on the tool bar. Each weed pulling unit has a pair of engaging pneumatic tires that are driven in opposite directions with a hydraulic motor. A pair of gauge and guide wheels connected to the tool bar locate the tool bar and weed pulling wheels above the surface of the ground so that the engaging rotating pneumatic tires will pull weeds from the rows of crops.

24 Claims, 9 Drawing Figures

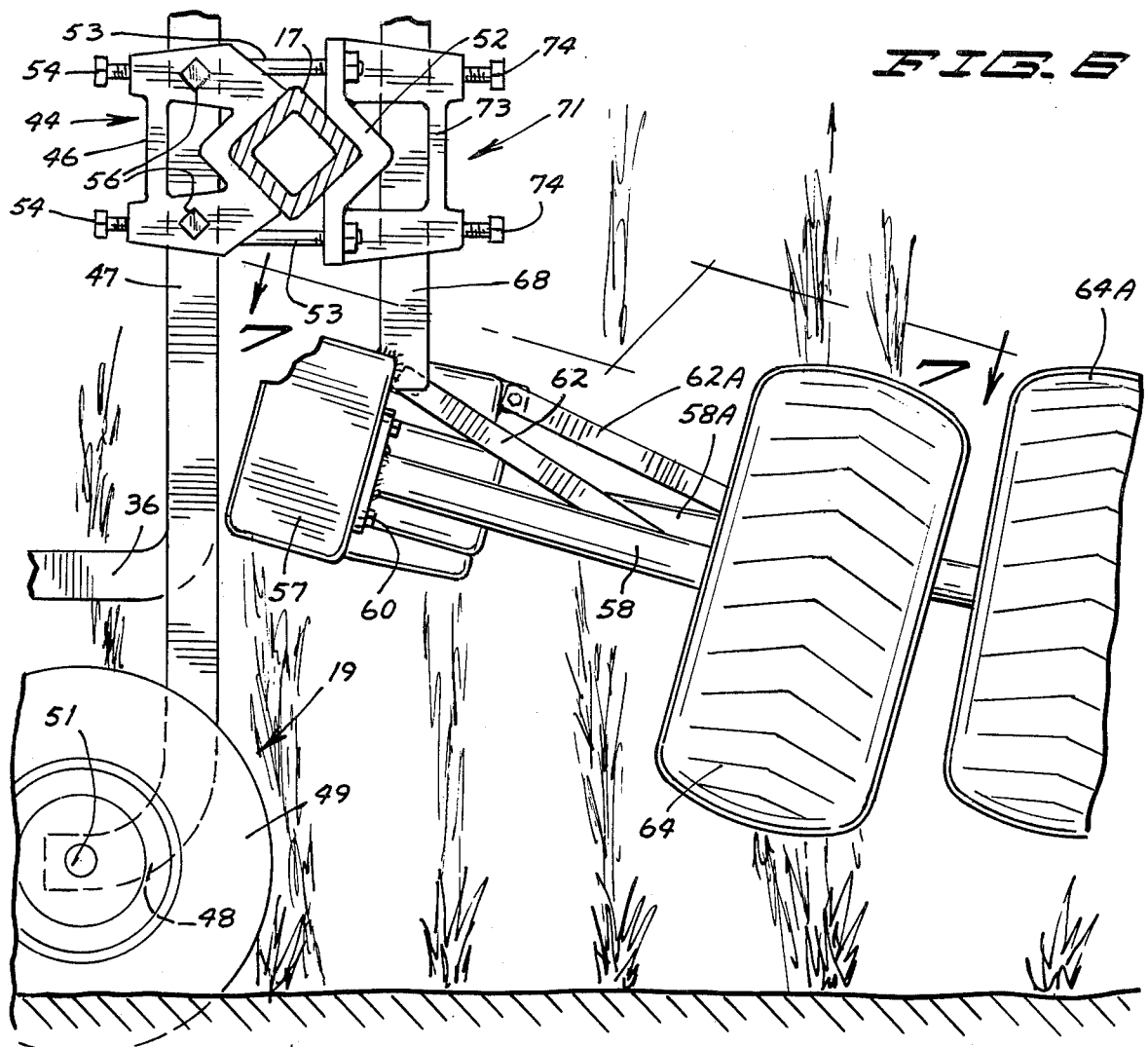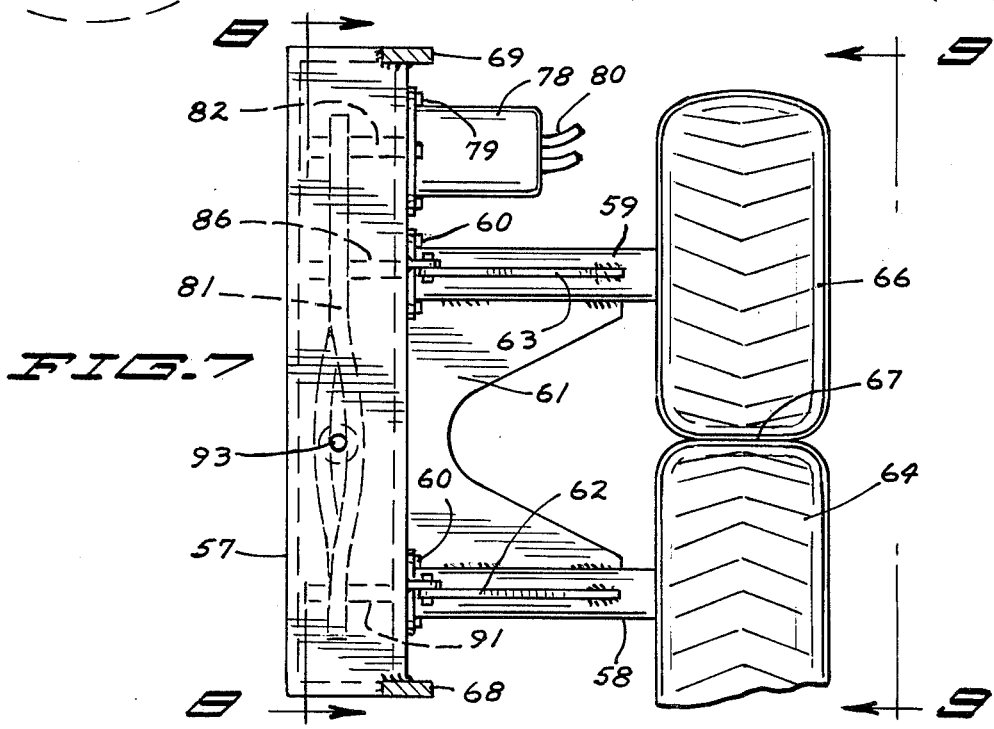

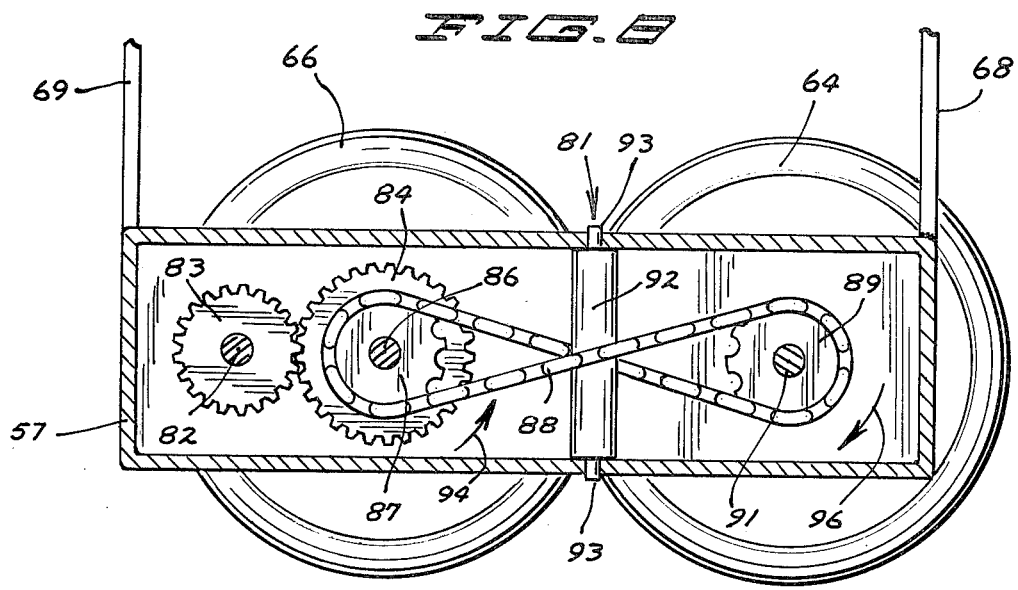
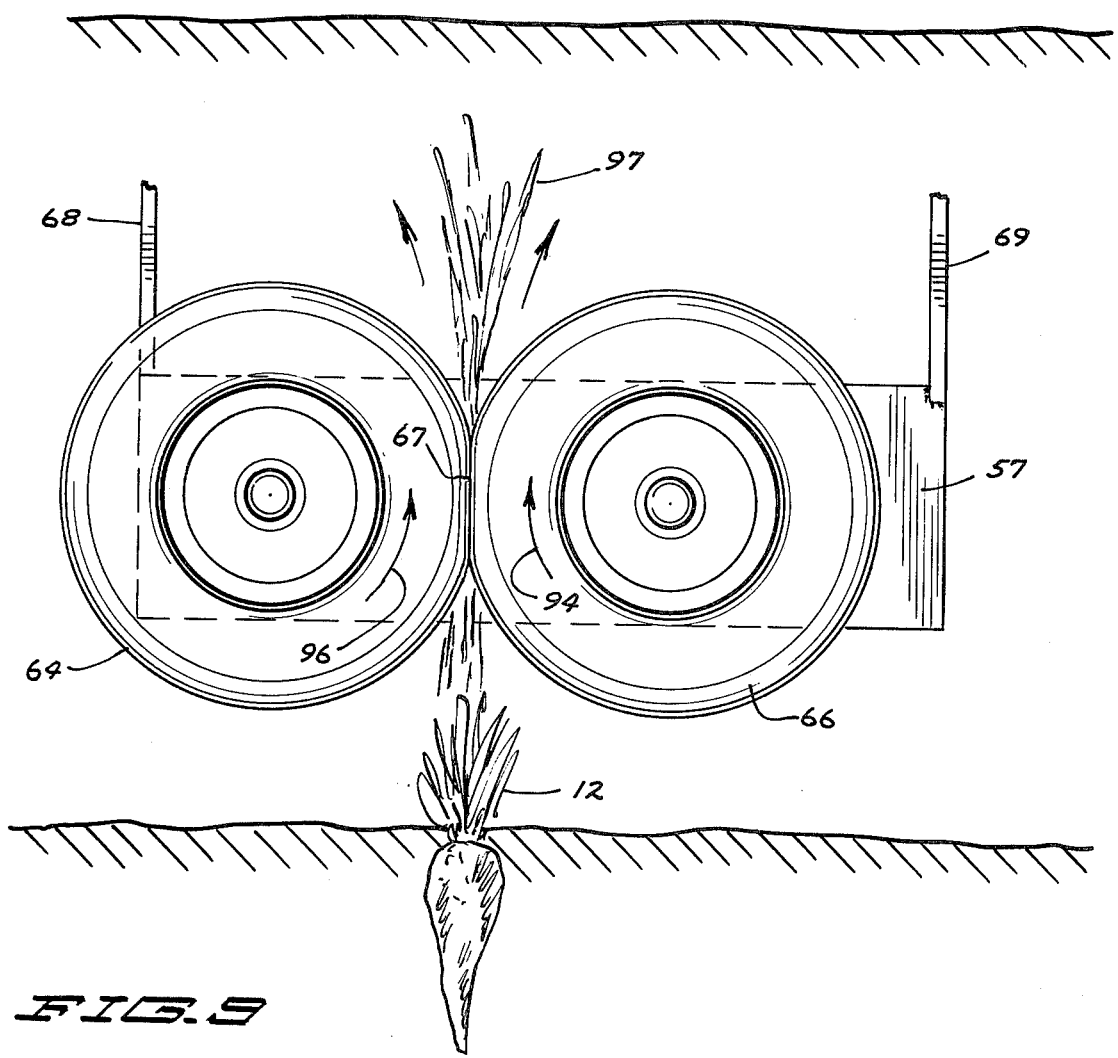

WEED PULLING MACHINE

BACKGROUND OF INVENTION

Row crops, as sugar beets, must be thinned and weeded to provide growing conditions that result in maximum yields. Row crop cultivators, as shown in U.S. Pat. Nos. 3,680,648, are used to cultivate the ground between the rows to control weeds. These cultivators do not remove or control the weeds in the rows. Herbicides are used for weed control in the rows. An example of an herbicide incorporator is shown in U.S. Pat. No. 3,741,137. Notwithstanding the application of herbicides and between row cultivation, weeds such as pig weed, lamb's quarters, mustard and the like, are still found in beet fields. Hand laborers using hoes work the fields to thin the beets and remove the unwanted weeds. The hand labor is time consuming and costly.

Machines for pulling stalks out of the ground have been known since 1872. Merriman in U.S. Pat. No. 133,110 describes a machine for pulling cotton stalks out of the ground. This machine has two rollers biased together and driven by ground engaging wheels. Similar machines are disclosed by Jones in U.S. Pat. No. 1,379,571 and Bailey in U.S. Pat. No. 1,821,131. Both of these machines have two pairs of rollers driven by separate ground wheels. The same stalks are pulled by both rollers. Tucker dscribes in U.S. Pat. No. 2,066,864 a cotton stalk pulling machine having two rolls driven by ground wheels. A separate from carrying a ground engaging wheel is used to rotatably support the rolls. Barrentine in U.s. Pat. No. 3,437,152 has two pairs of rollers operable by a power takeoff drive to pull two rows of coton stalks. The pulled stalks are cut with rotary knives before they are discharged back to the ground.

SUMMARY OF INVENTION

The invention is directed to a machine for pulling weeds from a plurality of rows of crops having both crops and weeds. The machine has a transverse tool bar mountable on a draft vehicle, as a tractor, with a hitch assembly,. A plurality of weed pulling units are mounted on the tool bar. Each weed pulling unit has first and second wheel means driven about generally longitudinal axes that are located in planes extended generally parallel to the rows of crops. Each axis is inclined upwardly in a forward direction. Clamp and standard structure is used to attach weed pulling unit to the tool bar in a manner which permits the units to be vertically adjustable. Each of the wheel means has a surface that is engaged with an adjacent wheel means. A power transmitting means mounted on the weed pulling unit drives the first and second wheel means in opposite directions whereby weeds between the first and second wheel means are pulled from the ground as the machine moves along the rows of crops. A power means is operable to supply power to the power transmission means.

In one form of the invention, the power means has a hydraulic motor mounted on the weed pulling unit and connectd with suitable hoses to the hydraulic power system of the draft vehicle. The power means can be mechanical power transmitting structure, as gear boxes and power takeoff drive connected to the draft vehicle.

The tool bar is supported at a selected elevation with a gauge and guide wheel means. The gauge and guide wheel means are connected with releasable clamps to the ends of the tool bar. The clamps have structure which permit the gauge and guide wheel means to vertically adjust the position of the tool bar. Vertical adjustment of the tool bar locates the wheel means of the weed pulling units at elevations selected in accordance with the height of the weeds and crops.

An object of the invention is to provide a machine that can effectively pull weeds from a row of crops, as sugar beets, without pulling the beets from the ground. A further object of the invention is to provide a machine for pulling weeds with a plurality of units that are vertically adjustable on a transverse tool bar. A further object of the invention is to provide a machine for pulling weeds with gauge and guide wheel structures that are adjustably attached to a tool bar to adjust the vertical position of the tool bar and the weed pulling units. Another object of the invention is to provide a weed pulling machine with guide wheels which follow furrows in the soil to guide the machine generally parallel to rows of crops. Yet another object of the invention is to provide an apparatus for pulling weeds with a unit that includes a housing mounted on a tool bar which accommodates a power transmission means operable to transmit power to a pair of interengaging pneumatic tires and supports a power unit, such as an hydraulic motor. A still further object of the invention is to provide an apparatus for pulling weeds that is operable to effectively pull weeds from a plurality of rows of crops of a relatively fast rate, is easy to operate, and requires little maintenance. Yet another object of the invention is to provide an apparatus for pulling weeds having a plurality of weed pulling units that are readily connected to a towing tractor and is adapted to be mounted on different types of tractors without additional structures.

IN THE DRAWINGS

FIG. 1 is a top plan view of the row crop weed pulling machine of the invention mounted on a three point hitch of an agricultural tractor;

FIG. 6 is an enlarged sectional view taken along the line 6—6 of FIG. 1;

FIG. 7 is a reduced scale sectional view taken along the line 7—7 of FIG. 6;

FIG. 8 is an enlarged sectional view taken along the line 8—8 of FIG. 7; and

FIG. 9 is an end elevational view taken along line 9—9 of FIG. 7.

DESCRIPTION OF PREFERRED EMBODIMENT

Figure 2:
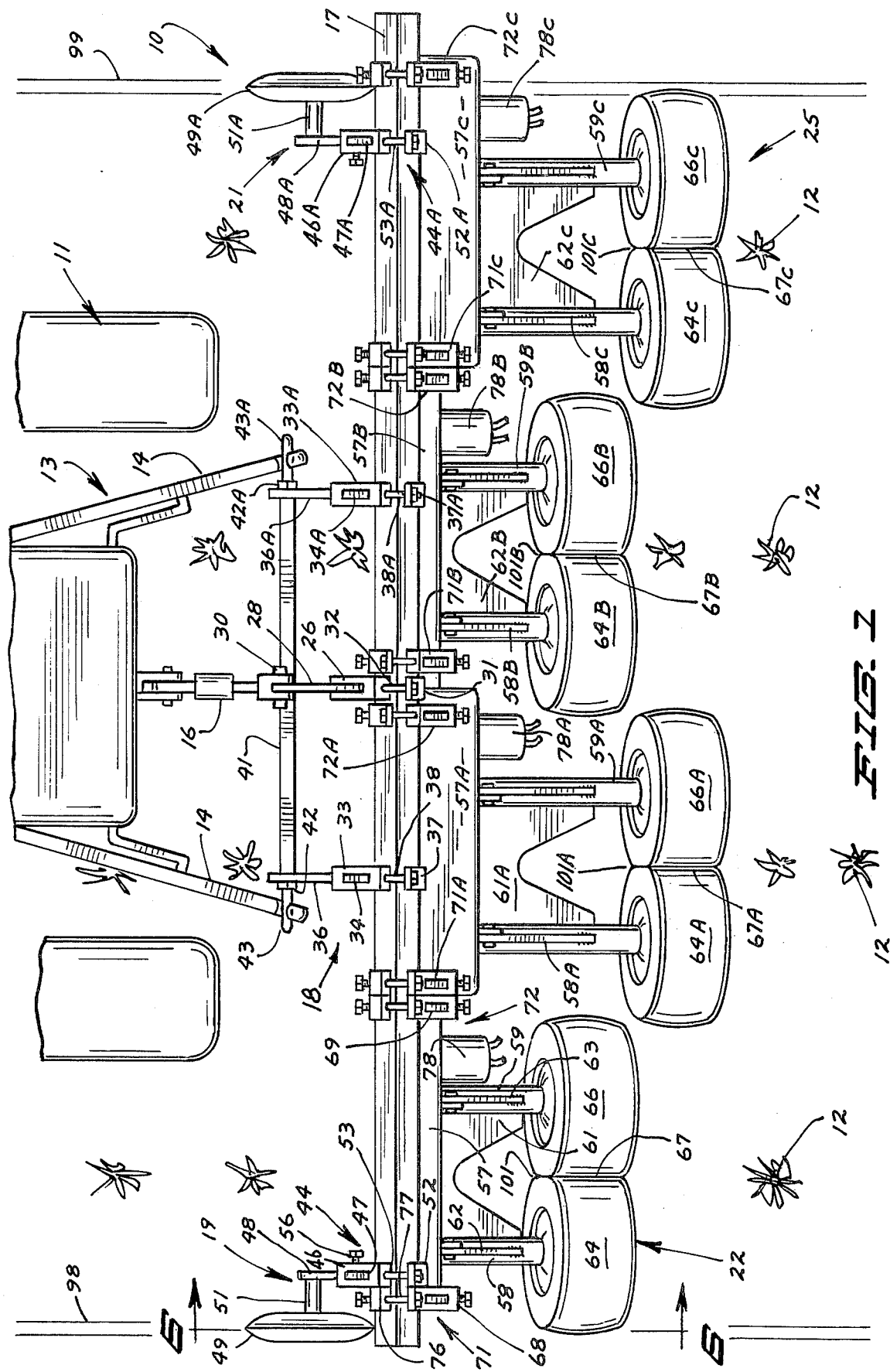
FIG. 2 is a side elevational view of the right side of the weed pulling machine of FIG. 1.
Figure 2:
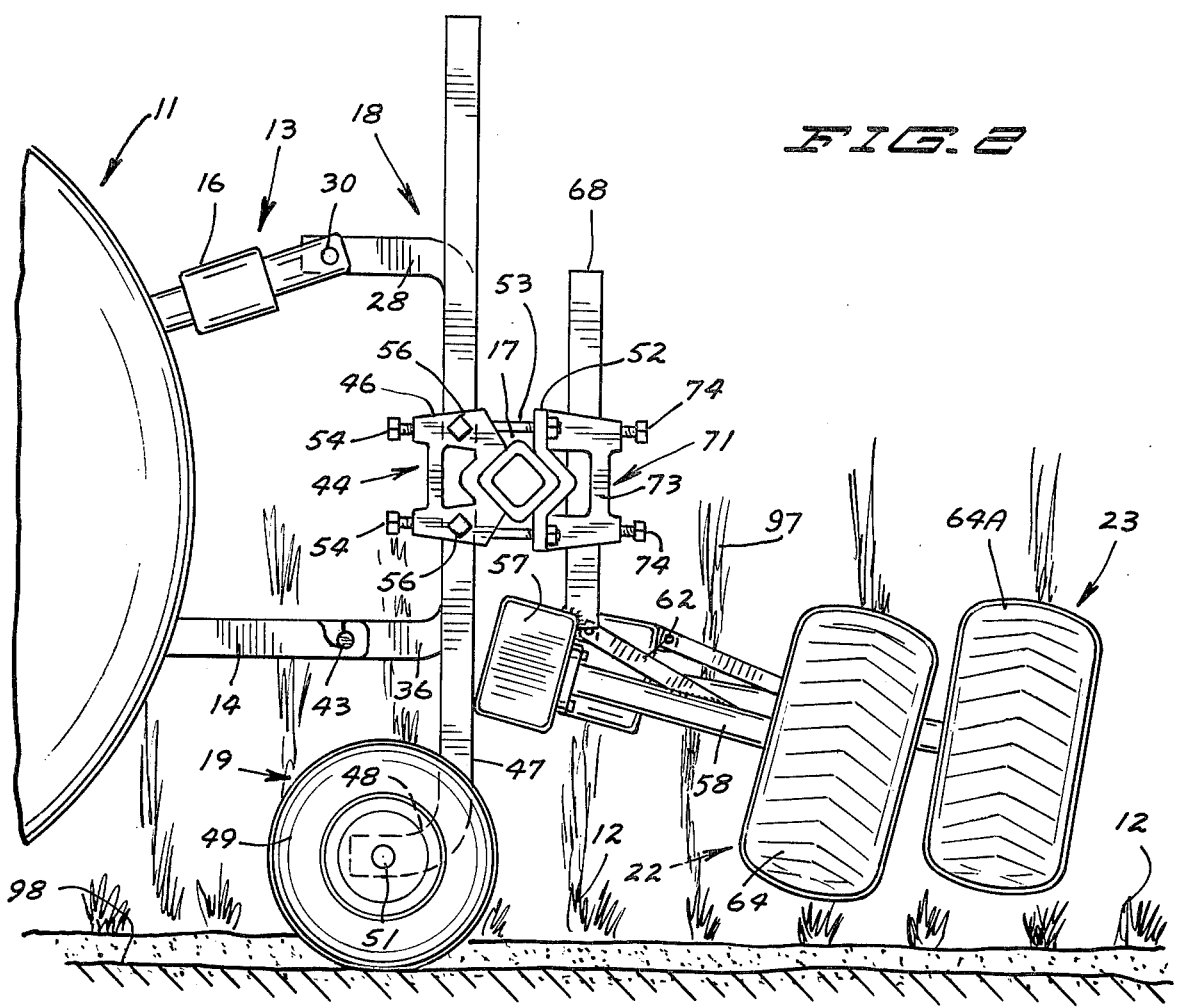

Referring to FIG. 1, there is shown the weed pulling machine of the invention indicated generally at 10 mounted on an agricultural tractor 11. Machine 10 is located in a field of longitudinal row crops 12, such as sugar beets, and is operable to pull tall weeds, as pig weeds, mustard, lamb's quarters and like weeds, that are growing in rows 12. The soil between the rows is cultivated to control the weeds with a cultivator, such as the row crop cultivator disclosed in U.S. Pat. No. 3,680,648.

Tractor 11 has a conventional three point hitch indicated generally at 13. Hitch 13 includes a pair of rearwardly directed draft links 14 and a center top or control link 16.

The weed pulling machine 10 has a transverse tool bar 17. Tool bar 17 is an elongated linear beam, such as a 15 cm square beam. Other types and sizes of beams can be used for the tool bar 17. A hitch assembly indicated generally at 18, shown in FIGS. 1, 3, 4, and 5, mounts tool bar 17 to the three point hitch 13. A pair of guide and support wheels indicated generally at 19 and 20 support the outer ends of tool bar 17 at a selected elevation above the ground. Weed pulling units indicated generally at 22, 23, 24, and 25 are mounted on the tool bar 17. Units 22–25 correspond in number to the rows of crops 12 located between the guide and support wheels 19 and 21.

Figure 3:
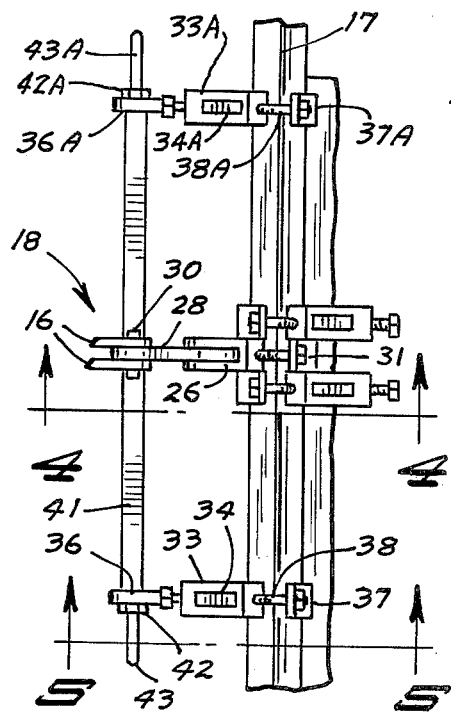
FIG. 3 is a top elevational view of the hitch assembly of the weed pulling machine.
Figure 4:
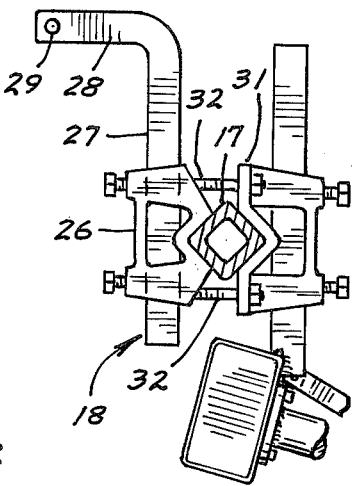
FIG. 4 is a sectional view taken along the line 4—4 of FIG. 3.
Figure 5:
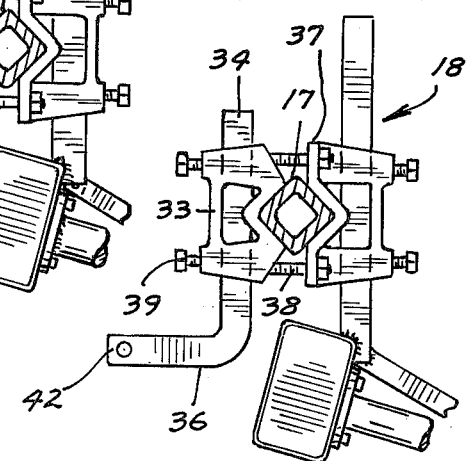
FIG. 5 is a sectional view taken along the line 5—5 of FIG. 3.

Referring to FIGS. 3–5, the hitch assembly 18 has a center clamp 26 carrying an inverted L-shaped bar 27. The bar 27 has a forwardly directed arm or projection 28 having a transverse hole 29. A pin 30, shown in FIG. 1, pivotally connects the bar 27 to the control link 16. Clamp 26 has a back 31 clamped to the center portion of tool bar 17 with a pair of bolts 32. A second clamp 33 carries an L-shaped bar 34. Bar 34 has a forwardly directed lower projection 36. A back 37 and a pair of bolts 38 clamp the body to the tool bar 17. Clamp body 39 carries a pair of bolts 39 which secure the bar 34 to the body in a selected vertical position. Hitch assembly 18 has a third clamp 33A. Clamp 33A carries an L-shaped bar 34A having a forwardly directed lower projection or arm 36A. Backs 37A and a pair of bolts 38A clamp the clamp body 33A to the tool bar 17. A transverse spacing bar 41 extends between arms 36 and 36A. Bolts 42 secure the ends of bar 41 to the arms 36 and 36A. Bolts 42 and 42A have outwardly directed stub projections or axles 43 and 43A adapted to be attached to the ends of the draft links 14. Clamps 26, 33 and 33A can be the clamps disclosed in U.S. Pat. Nos. 3,642,333 and 3,825,358. The structure of the clamps disclosed in these patents is incorporated herein by reference. Other types of clamps can be used to mount the L-shaped bars 27, 34 and 34A.

Referring to FIGS. 1, 2 and 6, the guide and wheel support 19 has a clamp indicated generally at 44 attached to the end of tool bar 17. Clamp 44 has an upright body 46 having an upright passage accommodating a standard or bar 47. The lower end of standard 47 has a forwardly directed leg or projection 48 carrying a wheel 49. A transverse axle 51 rotatably mounts wheel 49 on the forward end of leg 48. Wheel 49 has a tire or soil engaging member that has convex side walls terminating in a center ridge. Body 46 is secured to tool bar 17 with a back 52 and a pair of connecting bolts 53. The standard 47 is adjustably retained in body 46 with a first pair of longitudinally adjustable bolts 54 and a second pair of transverse adjusting bolts 56. The clamp 44 is disclosed in U.S. Pat. Nos. 3,642,333 and 3,825,358. The guide and support wheel 21 is identical to guide and support wheel 19. Parts of wheel 21 which correspond to wheel 19 are identified with the same reference numbers having the suffix A. Additional gauge and guide wheels can be mounted on tool bar 17.

Referring to FIGS. 1, 6 and 7, the weed pulling unit 22 has an elongated housing or casing 57 carrying a pair of rearwardly directed tubular members 58 and 59. Housing 57 is a rectangular box structure having a back wall and a removable cover plate. Fastening means, such as bolts 60, attach the ends of the tubular members 58 and 59 to the back wall of the housing 57. A plate-type yoke 61 is located between tubular members 58 and 59. The sides of the yoke 61 are secured by welds or the like to the sides of tubular members 58 and 59, thereby reinforcing and stabilizing the tubular members 58 and 59. Additional reinforcement for tubular members 58 and 59 in an upright direction is achieved by braces 62 and 63. The braces 62 and 63 are attached to housing 57 and to rear portions of the tubular members 58 and 59. Members 58 and 59 extend rearwardly and downwardly from housing 57 and are located in separate vertical extended parallel to the rows of crops or transversely of tool bar 17. A first wheel 64 having a pneumatic tire is rotatably mounted on the end of tubular member 58. A second wheel 66 having a pneumatic tire is rotatably mounted on the end of tubular member 59. The wheels 64 and 66 are mounted on drive shafts 91 and 86 respectively. Suitable bearings, not shown, rotatably mount the shafts 91 and 86 in the tubular members 58 and 59. Wheels 64 and 66 are inclined rearwardly so that the lower parts of the tires are located forward of the upper parts of the tires. The space between the lower parts of the tires forms a mouth for receiving weeds. The lower parts of the tire guide the weeds to the engaging sections 67 of the tires. The pneumatic tires of wheels 64 and 66 have cooperating engaging sections 67 whereby each tire is deformed as the tires are rotated. The engaging sections 67 comprise overlapping portions of each tire. The amount or size of the overlapping portions is determined by the air pressure in the tires. The greater the air pressure in the tires, the greater the overlapping portions. The pneumatic tires are two or more ply turf-type tires having a width of 12 inches and a diameter of 18 inches. Each tire has generally V-shaped treads which facilitate gripping the weeds and self-cleaning of material that may accumulate on the tires. Other tire sizes and tread designs can be used.

Upright bars or standards 68 and 69 are secured to opposite ends of housing 57. Standard 68 is connected to tool bar 17 with a clamp indicated generally at 71. A similar clamp 72 is connected to the standard 69. Clamps 71 and 72 adjustably hold standards 68 and 69 at selected elevations whereby the tire weed pulling unit 22 can be vertically adjusted. Clamp 71 has a body 73 having an upright passage for accommodating standard 68. A pair of bolts 74 hold the standard 68 in a fixed position on body 73. A back 76 accommodating a pair of connecting bolts 77 secure body 73 to tool bar 17. Clamp 72 is identical to clamp 71. The structure of clamps 71 and 72 is disclosed in U.S. Pat. Nos. 3,642,333 and 3,825,358. The structure of these clamps is incorporated herein by reference.

As shown in FIGS. 1 and 7, a power unit or hydraulic motor 78 mounted on housing 57 adjacent the tubular member 59 is operable to concurrently rotate the wheels 64 and 66 at desired speeds. A plurality of bolts 79 secure the motor 78 to a part of housing 57. Hydraulic fluid lines 80 are coupled to the motor 78 and a hydraulic power source, such as tractor 11. The speed of the motor 78 is regulated by controlling the fluid supplied to the motor. The motor speed is independent of the ground speed of the machine.

As shown in FIGS. 7 and 8, a power transmission indicated generally at 81 is located in a chamber in housing 57 and transmits the power from the hydraulic motor 78 to shafts 86 and 91 that are drivably attached to the wheels 64 and 66. Power transmission 81 comprises a gear 83 attached to drive shaft 82 of the hydraulic motor. Gear 83 is in driving engagement with a second gear 84 mounted on shaft 86. A sprocket 87 is also mounted on shaft 86. An endless chain 88, such as a roller chain, is trained about sprocket 87 and a second sprocket 89. Sprocket 89 is mounted on drive shaft 81. A generally upright roller 92 is located between the crossed portions of chain 88 to keep the separate portions of the chain apart while in use. The roller 92 is rotatably mounted on a generally upright stub axle or shaft 93 extended through suitable holes in housing 57. Other types of spacing structure can be used to separate and keep chain 88 in alginment with sprockets 87 and 89. Other types of power transmitting structures can be used to transmit power form the hydraulic motor to the shafts 86 and 91.

On operation of the hydraulic motor 78, the shaft 86 will be driven in the direction of arrow 94. The chain 88 will transmit power to shaft 91 to rotate the wheel 64 in the direction of arrow 96. The coacting sections 67 of the pneumatic tires continuously move upwardly so that any material, such as weeds or the like 97, that may come between the tires will be pulled upward out of the ground.

The weed pulling unit 24 is identical with unit 22. The parts of weed pulling unit 24 that correspond to parts of unit 22 are identified with the same reference numbers having the suffix B. Weed pulling units 23 and 25 are identical. These weed pulling units are the same as weed pulling unit 22 except that the tubular members 58 and 59 are longer so that wheels 64A and 66A clear wheels 66 and 64B. The parts of weed pulling unit 23 that correspond to parts of unit 22 have the same reference numbers with the suffix A. In a similar manner, the parts of weed pulling unit 25 that are the same as weed pulling unit 22 have the same reference numbers with the suffix C.

In use, the hitch assembly 18 mounts the weed pulling machine 10 on the three point hitch 13 of the tractor 11. The wheels 49 and 49A are aligned with longitudinal furrows 98 and 99 respectively in the field between adjacent rows of crops. Furrows 98 and 99 are made by previous cultivation and function as guide furrows for the wheels 49 and 49A on forward movement of the machine. The front wheels of the tractor follow similar guide furrows between the rows of crops. On forward movement of the tractor, the guide furrows 98 and 99, in conjunction with wheels 49 and 49A, keep the machine 10 aligned with the rows of crops so that the cooperating wheels 64 and 66 of each of the weed pulling units are aligned with a row of crops. The hydraulic motors 78, 78A, 78B and 78C are connected to the hydraulic source of the tractor 11. Motors 78 and 78A may be connected in series. In a similar manner, motors 78B and 78C may be connected directly with the source of hydraulic fluid pressure. On operation of the motors, the power transmitting means 81 will drive wheels 64 and 66 in opposite directions. The coacting engaging surfaces 67 of the pneumatic tires will move in an upward direction. The wheels 64 and 66, being located at an upwardly and rearwardly inclined angle, have a bottom mouth area or space 101 for gathering and collecting portions of the weeds so that they are guided between the flattened engaging surfaces 67 of the pneumatic tires. On forward movement of machine 10, the rotating tires will pull the weeds out of the ground. The tires, being located above the beet plants 12, will engage only some of the beet leaves and will not remove the beets from the ground.

While there has been shown and described a preferred embodiment of the invention, it is understood that changes in the size, structure and combination of structure can be made by those skilled in the art without departing from the invention.

The embodiments of the invention in which an exclusive property or privilege is claimed are defined as follows:

1. An apparatus for pulling weeds and the like from a row of crops and weeds comprising: a transverse tool bar mountable on a draft vehicle, a weed pulling unit attached to the tool bar, said unit having a housing and generally rearwardly directed spaced members attached to the housing, first shaft means rotatably mounted on one of the members, second shaft means rotatably mounted on the other of the members, first wheel means attached to the first shaft means, second wheel means attached to the second shaft means, said first and second wheel means being rotatable about axes located in planes extended generally parallel to the row, each of said wheel means having surfaces that engage each other and adapted to engage the weeds in the row and pull the weeds out of the ground, power transmission means to drive said first and second wheel means in opposite directions whereby said weeds between said first and second wheel means are pulled from the ground, said power transmission means being located in said housing and drivably connected to the first shaft means and second shaft means to rotate the first and second shaft means in opposite directions, and power means operable to supply power to the power transmission means.

2. The apparatus of claim 1 including: clamp means attachable to the tool bar, and standard means cooperating with the clamp means and connected to the unit whereby the elevation of the first and second wheel means can be adjusted relative to the tool bar.

3. The apparatus of claim 1 including: means to support the tool bar at a selected elevation above the ground whereby the first and second wheel means are held at a selected elevation above the ground.

4. The apparatus of claim 3 wherein: the means to support the tool bar at a selected elevation comprises third wheel means, upright standards attached to the third wheel means, and clamp means for attaching the standard to the tool bar.

5. The apparatus of claim 4 wherein: the clamp means has means for holding the standards at selected positions thereby adjusting the elevation of the standard.

6. The apparatus of claim 1 wherein: the power transmission means includes a hydraulic motor mounted on said unit and power transmitting means for driving said first and second wheel means at substantially the same speeds.

7. The apparatus of claim 1 wherein: the first and second wheel means are resilient pneumatic tires in pressure engagement with each other providing a substantial area of surface engagement.

8. The apparatus of claim 7 wherein: said substantial surface of engagement is generally flat.

9. The apparatus of claim 1 wherein: the power means includes at least one hydraulic motor and the power transmission means drivably connects the motor to at least one of the shaft means.

10. The apparatus of claim 1 wherein: the means mounting the housing on the tool bar includes upright standard means secured to the housing, and clamp means attaching the standard means to the tool bar.

11. The apparatus of claim 10 including: means on the clamp means operable to hold the standard means at a selected vertical position whereby the elevation of the first and second wheel means relative to the ground can be adjusted.

12. The apparatus of claim 1 including: plate means located between the members, said plate means being secured to the members.

13. The apparatus of claim 1 wherein: the power means includes a hydraulic motor mounted on the housing and drivably connected to the power transmitting means.

14. The apparatus of claim 1 wherein: the power transmitting means includes a chain and sprocket drive between the first shaft means and the second shaft means and the power means includes a hydraulic motor mounted on the housing and drivably connected to the power transmitting means.

15. The apparatus of claim 1 wherein: a plurality of weed pulling units as set forth in claim 1 are attached to the tool bar.

16. The apparatus of claim 1 including: means to support the tool bar above the ground, said means having a first wheel and standard connected to the wheel mounted on one end section of the tool bar and a second wheel and standard connected to the second wheel mounted on the other end section of the tool bar.

17. The apparatus of claim 1 wherein: the first and second wheel means are resilient pneumatic tires in pressure engagement with each other, each of said tires having external treads engageable with the weeds.

18. The apparatus of claim 17 wherein: the treads are generally V-shaped.

19. An apparatus for pulling weeds and the like from crops comprising: a transverse tool bar, hitch means connected to the tool bar for mounting the tool bar on a draft vehicle, a weed pulling unit attached to the tool bar, said unit having rearwardly directed spaced members, a first shaft means rotatably mounted on one of the members, a second shaft rotatably mounted on the other of the members, first wheel means attached to the first shaft means and second wheel means attached to the second shaft means, said first and second wheel means being rotatable about generally longitudinal axes, each of said wheel means having a surface engageable with the other wheel means and adapted to engage the weeds in the row and pull the weeds out of the ground, drive means to apply a rotating force directly to said first shaft means and said second shaft means thereby rotating said first and second wheel means in opposite directions whereby said weeds between said first and second wheel means are pulled from the ground, and means mounting the weed pulling unit to the tool bar, said mounting means including means which permit the vertical adjustment of the weed pulling means relative to the tool bar.

20. The apparatus of claim 19 including: means to support the tool bar at a selected elevation comprising a third wheel means, upright standards attached to the third wheel means, and clamp means for attaching the standards to the tool bar.

21. Apparatus of claim 19 wherein: the drive means includes at least one hydraulic motor and power transmitting means connecting the hydraulic motor to the first and second wheel means.

22. The apparatus of claim 19 wherein: the weed pulling unit has a housing, a plurality of upright standards secured to the housing, said means mounting the weed pulling unit to the tool bar comprising clamp means attached to the tool bar and accommodating the upright standards, and means for releasably holding the standard on the clamp means.

23. The apparatus of claim 19 wherein: the weed pulling unit includes a housing having a chamber, said drive means including a power transmission means located in the chamber and a power means mounted on the housing.

24. The apparatus of claim 23 wherein: the power means is a hydraulic motor.

* * * * *

UNITED STATES PATENT AND TRADEMARK OFFICE
CERTIFICATE OF CORRECTION

PATENT NO. : 4,027,733
DATED : June 7, 1977
INVENTOR(S) : Fred W. Eisenhardt and Wayne S. Tonsfeldt It is certified that error appears in the above-identified patent and that said Letters Patent are hereby corrected as shown below:

Column 1, line 28, "dscribes" should be -- describes --.

Column 1, line 30, "from" should be -- frame --.

Column 1, line 62, "connectd" should be -- connected --.

Column 2, line 29, "of" should be -- at --.

Column 4, line 11, after "vertical" insert -- planes --.

Column 5, line 12, "alginment" should be -- alignment --.

Signed and Sealed this

Eleventh Day of October 1977

[SEAL]

Attest:

RUTH C. MASON
Attesting Officer

LUTRELLE F. PARKER
Acting Commissioner of Patents and Trademarks